Figure 1:
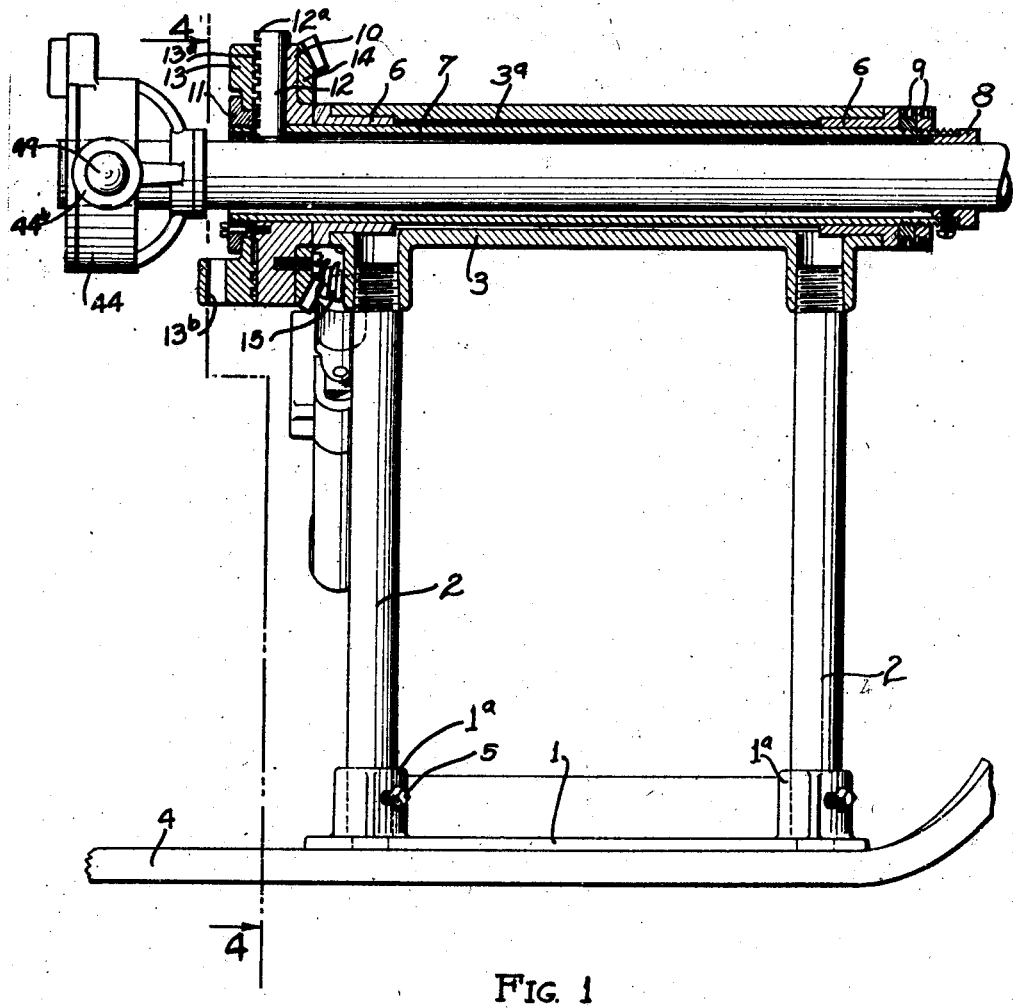

April 2, 1929.  E. R. BOURNE  1,707,456
PIPE THREADING MEANS
Filed May 20, 1926  4 Sheets-Sheet 1

INVENTOR.
ESTAL R. BOURNE
BY A. B. Bowman
ATTORNEY

April 2, 1929.  E. R. BOURNE  1,707,456
PIPE THREADING MEANS
Filed May 20, 1926   4 Sheets-Sheet 2

INVENTOR.
ESTAL R. BOURNE.
BY A. B. Bowman
ATTORNEY

Patented Apr. 2, 1929.

1,707,456

UNITED STATES PATENT OFFICE.

ESTAL R. BOURNE, OF SAN DIEGO, CALIFORNIA.

PIPE-THREADING MEANS.

Application filed May 20, 1926. Serial No. 110,318.

My invention relates to a pipe threading means, and the objects of my invention are: First, to provide a pipe threading means in which the pipe to be threaded revolves and the die means for cutting the threads is non-revolubly mounted relative to the pipe holding means, but moves longitudinally relative thereto and to the pipe adapted to be threaded; second, to provide a pipe threading means having a revoluble pipe containing sleeve provided with a self centering pipe holding chuck at one end and a pipe guiding collar at its opposite end for receiving, holding and revolving pipe of various diameters for cutting the same and for cutting threads at the one end thereof; third, to provide a portable pipe threading means in combination with a self-propelled vehicle or delivery truck in which the pipe holding means is revolubly mounted at the side of the vehicle and operatively connected with the power plant of the self-propelled vehicle, which power plant is adapted for propelling the vehicle and for rotating the pipe holding means; fourth, to provide novel gear shifting and clutch means for connecting the pipe holding means with the power plant of the vehicle when said power plant is not connected for driving the vehicle; fifth, to provide novel guide means in connection with a revoluble pipe holding means for guiding a thread cutting die longitudinally relative to the pipe holding means for cutting threads at the one end of the pipe adapted to be held by the pipe holding means; sixth, to provide guide means in connection with a revoluble pipe holding means or chuck which is adapted to support one end of a thread cutting die in such a manner that the die may be pivoted thereon and guided longitudinally relative to the pipe holding means or chuck and also guided at its opposite end in its longitudinal movement relative to the pipe holding means or chuck; seventh, to provide a revoluble pipe holding chuck, for revolving a pipe section, and a non-revoluble die adapted to be longitudinally guided and supported relative to the chuck, said die having readily separable thread cutting members whereby said thread cutting members may be quickly released and radially shifted from the pipe when the thread is cut thereon for quickly removing the die therefrom; eighth, to provide a pipe threading means of this class whereby the length of the thread cut on the pipe may be seen at all times and whereby the thread cutting members of the die may be readily lubricated while cutting threads on the pipe; ninth, to provide as a whole a novelly constructed pipe threading means of this class, and tenth, to provide a pipe threading means of this class which is very simple and economical of construction, durable, efficient, compact, which may be readily removed from the vehicle or truck body, and which will not readily deteriorate or get out of order.

Figure 2:
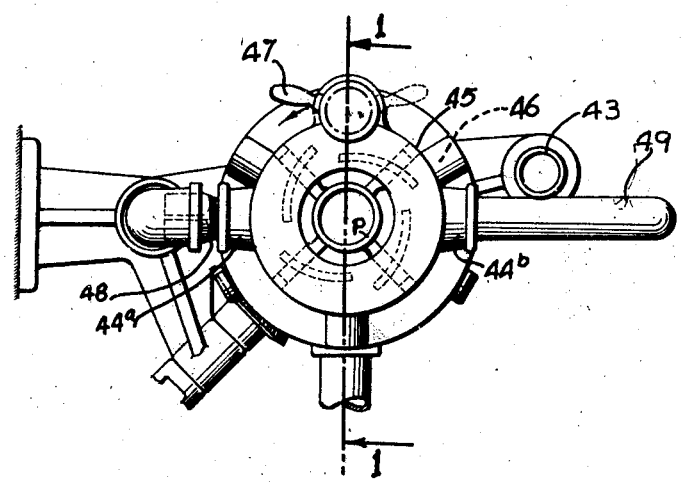
Figure 3:
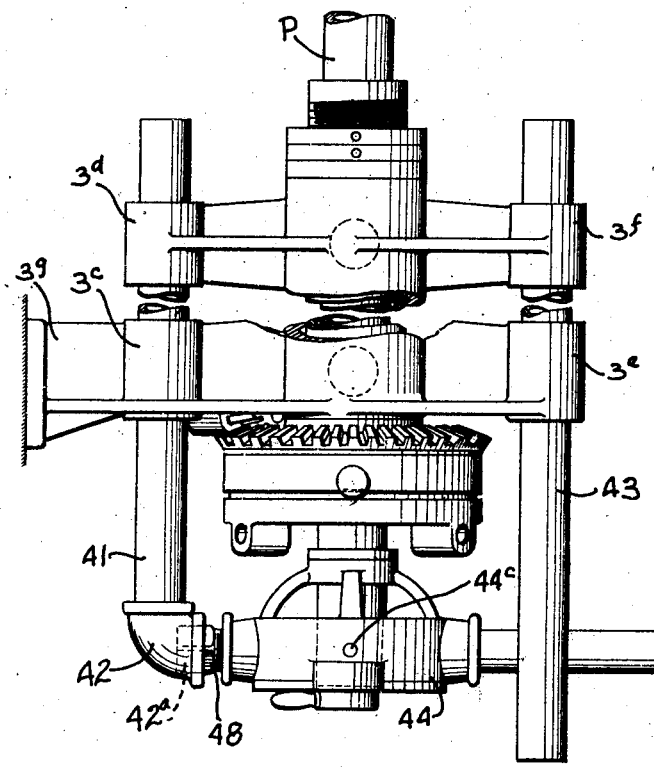
Figure 4:
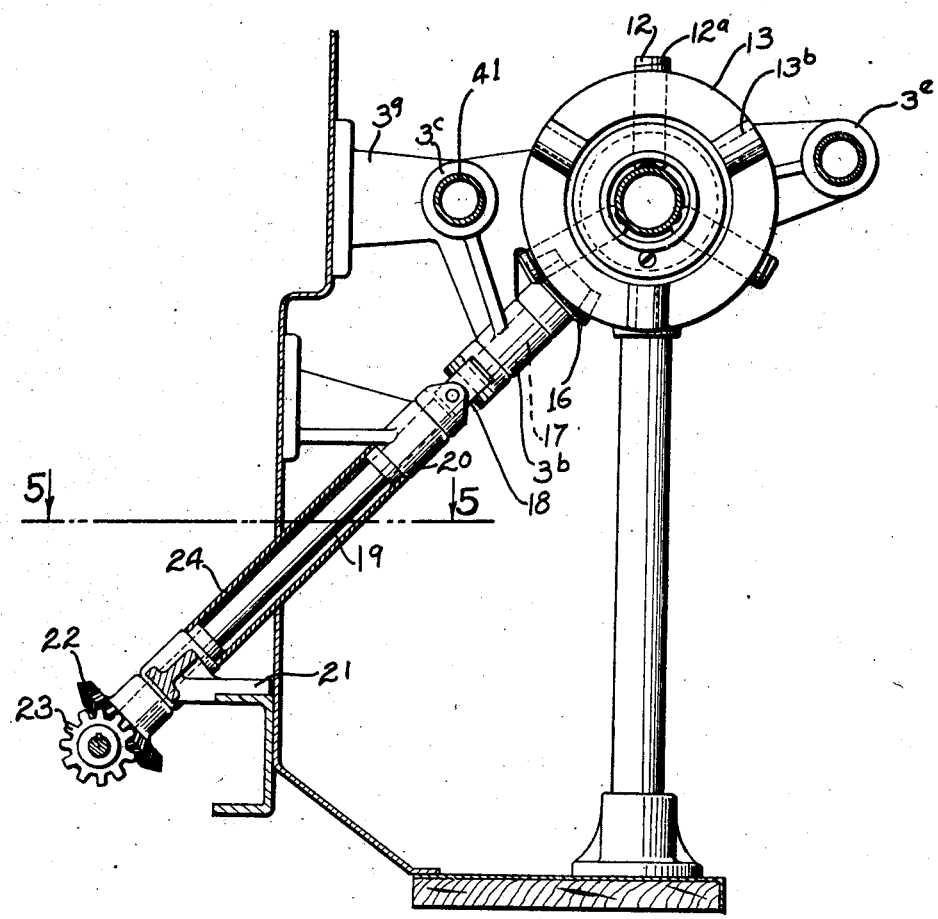
Figure 5:
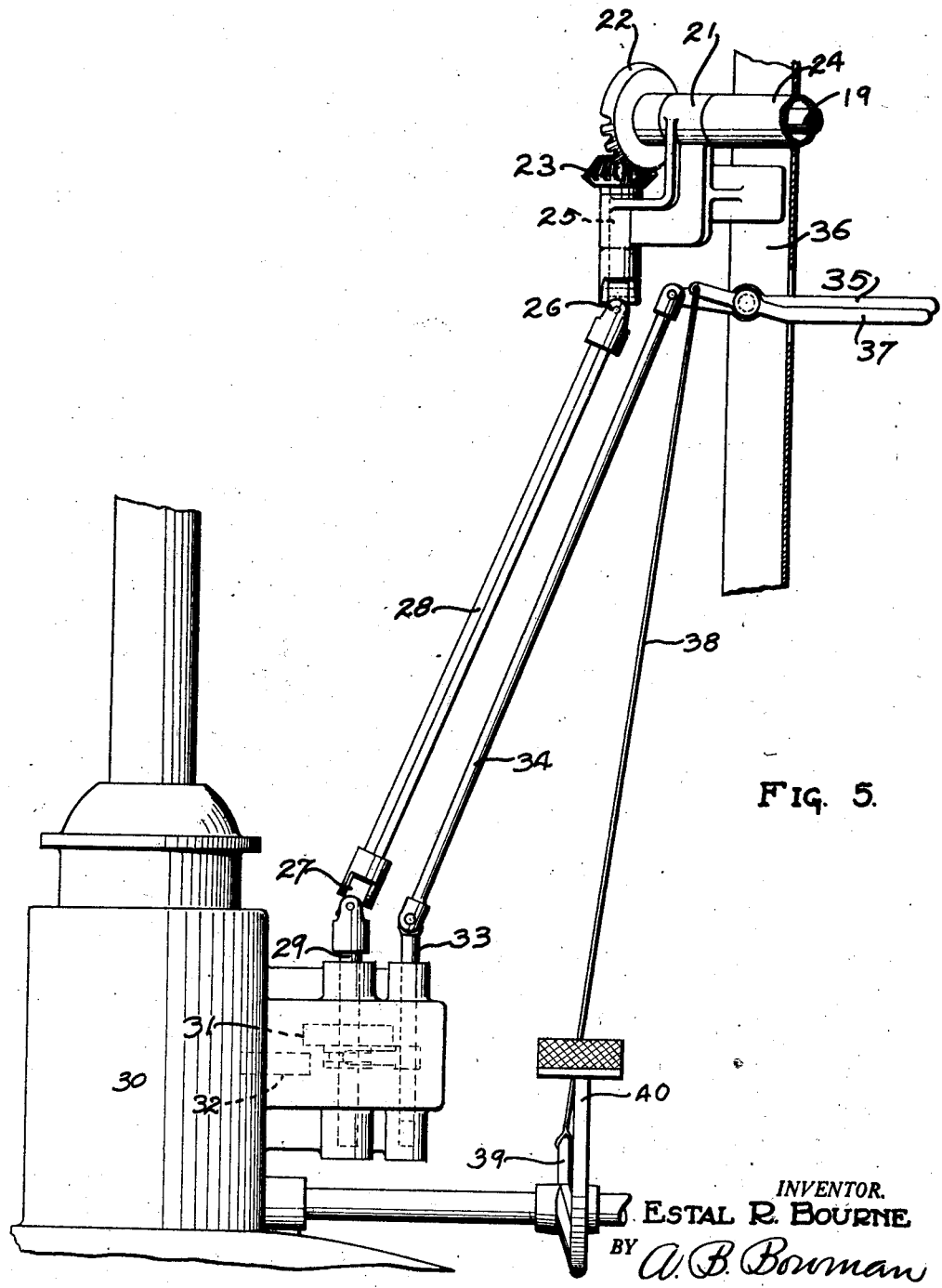

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my pipe threading means in its preferred form of construction, showing the same mounted on the running board at the one side of a vehicle, the body of the vehicle being shown fragmentarily, certain parts and portions of the upper part of my means being broken away and in section to facilitate the illustration, the section thereof being taken through 1—1 of Fig. 2; Fig. 2 is a fragmentary front elevational view thereof, showing the die and guide means in place; Fig. 3 is a fragmentary top view thereof; Fig. 4 is a partial sectional and partial elevational view thereof, taken at 4—4 of Fig. 1, showing the die removed and other portions in section to facilitate the illustration; and Fig. 5 is a sectional view thereof in plan, taken at 5—5 of Fig. 4, showing particularly the means for operatively connecting the revoluble chuck with the power plant of the vehicle and also the gear and clutch means for controlling the same.

Like characters of reference refer to similar parts and portions throughout the several views of the drawings.

The supporting means of my pipe threading mechanism or means consists in one form of a base 1, upright pipe sections 2 and a head 3. The base member 1, as shown in the drawings, is mounted on and above the running board 4 at one side of the vehicle or truck body. This base member is provided with a pair of spaced apart sockets 1ª in which are removably positioned the lower ends of supporting pipe sections 2, said pipe sections being secured in the sockets 1ª by means of set screws 5. The upper ends of the pipe sections are secured into sockets at the lower side of the head 3 positioned above the base member and also to the side of the vehicle body. The central portion of the head 3 is provided with a hollow cylindrical portion 3ª extending from end to end. At the opposite ends of the portion 3ª are mounted bearing bushings 6 in which is revolubly mounted the sleeve 7 carrying a chuck at its one end and a removable pipe guiding collar 8 at its opposite end. The sleeve 7 is retained longitudinally within the head by the chuck at one end and a pair of lock nuts or collars 9 near the opposite end, which nuts or collars bear against the rear bearing bushing 6.

The chuck consists of a jaw carrying member 10 non-revolubly and longitudinally fixed relative to the sleeve 7 by means of a lock nut member 11, a plurality of jaws 12 reciprocally mounted in the jaw carrying member 10 in a radial direction, a screw member 13 and a drive gear 14. The jaws 12 are provided at their front sides with transversely and slightly angularly extending teeth 12ª, which extend beyond the front side of the jaw carrying member 10 and are adapted to be engaged by a scroll or spiral ridge 13ª provided at the back or inner side of the scroll member 13, said scroll member being positioned against the front side of the jaw carrying member by the lock nut member 11, as shown best in Fig. 1. The scroll member 13 is provided at its front side with a number of lugs 13ᵇ having radially extending holes for receiving a suitable tool for rotating the scroll member and thereby radially and simultaneously adjusting the jaw members 12.

The gear 14 is secured to the back side of the jaw carrying member 10 and is in the form of a bevel gear. This bevel gear is driven by a bevel pinion 16, which is secured to the one end of a shaft 17 extending downwardly at an angle toward the vehicle body, and is revolubly mounted in a journal 3ᵇ carried by the head 3. The opposite or lower end of the shaft 17 is connected, by means of a universal joint means 18, with another shaft 19 revolubly mounted at the end adjacent the universal joint means on a bracket 20 secured on the outside of the vehicle body and at its opposite end on a bracket 21 preferably mounted on the main frame of the vehicle. At the end of the shaft 19 extending diagonally into the interior of the vehicle body is mounted a bevel gear 22, which meshes with and is driven by a bevel pinion 23. The portion of the shaft 19 between the brackets 20 and 21 may be covered by a tubing 24, as shown. The pinion 23 is mounted at the one end of a shaft 25 also revolubly mounted in the bracket 21 at a right angle to the shaft 19. The opposite end of the shaft 25 is connected by means of a universal joint 26 with a diagonal connecting rod 28, which is connected, by means of a universal joint 27, with a shaft 29 revolubly mounted in the transmission casing 30 of the vehicle. On this shaft 29 is slidably mounted a gear 31, which is adapted to mesh with a gear 32 continuously rotated within the transmission casing 30 when the transmission mechanism is connected with the power plant of the vehicle.

The gear 31 may be shifted into mesh with the gear 32 by means of a gear shift rod 33 reciprocably mounted in the transmission casing and connected at its one end, by means of a rod 34, with the one end of a gear shift lever 35 pivotally mounted intermediate its ends on the frame 36 of the vehicle.

The clutch lever 37 for connecting and disconnecting the transmission mechanism with and from the power plant of the vehicle is preferably mounted on the same pivotal axis with the gear shift lever 35 and is pivotally connected at its one end, by means of a cable 38, with an arm 39 connected with and extending in the opposite direction from the main arm of the clutch pedal 40 of the vehicle.

When desiring to connect the chuck with the power plant, the lever 37 is shifted in a clockwise direction, the lever 35 shifted in a counter-clockwise direction, and the lever 37 released.

At the one side of the head 3 and near the opposite ends thereof are provided hollow bosses 3ᶜ and 3ᵈ in which is reciprocally mounted a guide member 41 in the form of a pipe section, which is provided at its forward end with a socket member 42, which may be in the form of elbow, the side opening of which is provided preferably with a polygonally shaped recess 42ª. It will be here noted that the head 3 is preferably braced relative to the body of the vehicle by means of a bracket portion 3ᵍ extending inwardly from the boss 3ᶜ, as shown. At the opposite side of the head 3 and near the opposite ends thereof are provided other hollow bosses 3ᵉ and 3ᶠ in which is removably positioned a guide member 43, also preferably in the form of a pipe section.

The die for cutting the threads on the pipe P, which is held in position by the chuck, is preferably of the type in which the thread cutting members or dies are readily separable in a radial direction, so that when the thread is cut on the pipe, the thread cutting members may be released and shifted outwardly from the cutting position, permitting the die to be shifted clear of the threaded end of the pipe while the same is revolving. This die is of conventional construction and consists essentially of a housing 44 in which is shiftably mounted in a radial direction a plurality of thread cutting members 45, their inward and outward positions being determined by the positions of spirally arranged cams 46 operating in slots in the thread cutting members and controlled in any suitable manner, such as gears, by lever means 47 at the one side of the housing. Said housing is provided at its opposite sides with outwardly extending bosses 44$^a$ and 44$^b$, in the former of which is secured a plug having a cross section corresponding with the recess in the socket member 42, and in the opposite boss 44$^b$ of which is secured a handle member 49 for handling the one or free side of the die and for non-rotatably guiding the same against the under side of the guide member 43, as shown in Fig. 2. Since the die does not rotate, the thread cutting members and pipe may be readily oiled through an oil hole 44$^c$ from the upper side of the die without interrupting the thread cutting operation.

When desiring to cut a thread, the thread cutting members 45 of the die are secured in their inward or thread cutting positions; the die is then placed with its plug 48 in the recess 42$^a$ and with its handle member 49 against the under side of the guide member 43; the die is then shifted toward the end of the pipe P extending beyond the front side of and revolving with the chuck. When the thread is of sufficient length, the thread cutting members are released and expanded radially by means of the lever 47; the die is then shifted away from the chuck, lowered at the end nearest the operator and removed from the socket member 42.

When not operating the pipe threading means, the guide members 41 and 43 are removed so that the same do not interfere with the normal operation of the truck or so that the same cannot be locked.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a portable pipe threading means, the combination with a self-propelled vehicle and a power plant for propelling the same, of a readily demountable supporting means mounted on the running board at the one side of the vehicle, a chuck revolubly mounted on said supporting means, a driveshaft extending through the side of said vehicle and operatively connected with said chuck, and a second driveshaft and universal joint means operatively connecting said first mentioned driveshaft with said power plant.

2. In a portable pipe threading means, the combination with a self-propelled vehicle and a power plant for propelling the same, of a readily demountable supporting means mounted on the running board at the one side of the vehicle, a pipe supporting chuck revolubly mounted on said supporting means, its axis extending horizontally and longitudinally with the vehicle, a driveshaft extending through the side of said vehicle and operatively connected with said chuck, a second driveshaft and universal joint means operatively connecting said first mentioned driveshaft with said power plant, and guide means mounted on said supporting means and extending towards the forward portion of said chuck for guiding a die longitudinally with the chuck and the vehicle.

3. In a pipe threading means of the class described, a supporting means, a pipe holding means revolubly mounted thereon, a guide means positioned at one side of said pipe holding means and shiftable longitudinally and parallel with the axis thereof, another guide means positioned at the opposite side of said pipe holding means and also extending parallel with the axis thereof, and a die having readily separable thread-cutting arms, one of said arms members and opposed being connectable with said first mentioned guide means and adapted to be supported and guided thereby and the other arm being guided to be guided by said other guide means.

4. In a pipe threading means of the class described, a supporting means, a pipe holding means revolubly mounted thereon, a guide means positioned at one side of said pipe holding means and shiftable longitudinally and parallel with the axis thereof, another guide means positioned adjacent said pipe holding means in spaced relation with said first mentioned guide means and also extending parallel with the axis of said pipe holding means, and a non-revoluble thread-cutting die adapted to be supported by said first mentioned guide means and guided longitudinally with the axis of said pipe holding means by both of said guide means.

5. In a pipe threading means of the class described, a supporting means, a sleeve revolubly mounted therein, a self centering chuck mounted on one end of said sleeve, a pipe guide collar mounted on the opposite end of said sleeve, guide means positioned at one side of said chuck and shiftable longitudially and parallel with the axis thereof, another guide means positioned adjacent said chuck in spaced relation with said first mentioned guide means and extending parallel with the axis of said chuck, and a non-revoluble thread-cutting die adapted to be supported by said first mentioned guide means and adapted to be guided longitudinally with the axis of said chuck by both of said guide means.

6. In a means of the class described, a supporting means, a revoluble pipe holding means supported by said supporting means, a non-revoluble thread-cutting die adapted to be supported in front of said pipe holding means, and pivotal and longitudinally shiftable guide means in connection with said die and in association with said pipe holding means for pivotally supporting one end of and guiding said die longitudinally with the axis of the latter.

7. In a portable pipe threading means, the combination with a self-propelled vehicle and a power plant for propelling the same, a supporting means mounted at the lateral side of the vehicle, a pipe-holding chuck revolubly mounted on said supporting means, a drive shaft extending angularly through the side of the vehicle and separately connected with said chuck, and a second driveshaft and universal joint means operatively connecting said first mentioned driveshaft with said power plant.

In testimony whereof, I have hereunto set my hand at San Diego, California, this 8th day of May, 1926.

ESTAL R. BOURNE.